(12) United States Patent
Shimamoto et al.

(10) Patent No.: US 6,528,917 B2
(45) Date of Patent: Mar. 4, 2003

(54) ELECTRIC ROTATING MACHINE AND METHOD OF CONNECTING FEEDING LEAD WIRES THERETO

(75) Inventors: Tadashi Shimamoto, Hitachi (JP); Manabu Suzuki, Hitachi (JP); Hidehiro Ejima, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/801,770

(22) Filed: Mar. 9, 2001

(65) Prior Publication Data

US 2001/0052734 A1 Dec. 20, 2001

(30) Foreign Application Priority Data

Jun. 9, 2000 (JP) ........................ 2000-179364

(51) Int. Cl.[7] .................... H02K 11/00; H02K 3/46
(52) U.S. Cl. .................. 310/71; 310/270; 310/60 A
(58) Field of Search .................. 310/71, 270, 60 A, 310/61, 260; 439/843, 825, 827

(56) References Cited

U.S. PATENT DOCUMENTS

| | | | | |
|---|---|---|---|---|
| 4,140,934 A | * | 2/1979 | Jager et al. | 310/71 |
| 5,015,895 A | * | 5/1991 | Obley | 310/71 |
| 5,063,320 A | | 11/1991 | Watanabe et al. | 310/270 |
| 5,122,696 A | * | 6/1992 | Shih et al. | 310/71 |

* cited by examiner

*Primary Examiner*—Thanh Lam
(74) *Attorney, Agent, or Firm*—Antonelli, Terry, Stout & Kraus, LLP

(57) ABSTRACT

An electric rotating machine includes a stator, a rotor core which can rotate inside the stator with a clearance between the rotor core and the inner surface of the stator, a stator winding formed around the rotor core, and a rotor having feeding lead wires connected to the rotor winding by a joint conductor. The feeding lead wire includes a first part connected to the joint conductor, a second part thinner than the first part, and a third part which is formed between the first and second parts and has a thickness changing from the thickness of the first part to the thickness of the second part. The first part also has through-holes to pass a cooling medium.

10 Claims, 8 Drawing Sheets

DISTANCE "X" BETWEEN THE POWER FEEDING LEAD WIRE AND THE JOINT PART

ELECTRIC ROTATING MACHINE AND METHOD OF CONNECTING FEEDING LEAD WIRES THERETO

BACKGROUND OF THE INVENTION

The present invention relates to an electric rotating machine and a method of connecting feeding lead wires thereto.

As disclosed in Japanese Patent Prepublication No. 7036/1991, a conventional rotary machine has increased the limit of elasticity and the resistance-to-compression-plastic-deformation of the linear rising part of each lead wire by cold-pressing the lead wire so that the linear rising part of the lead wire may be harder than the other part of the lead wire, machining and bending the lead wire, and welding the linear rising part of the lead wire to a connection member by electron beams. Or the conventional rotary machine has increased the limit of elasticity and the resistance-to-compression-plastic-deformation of the linear rising part of each lead wire by connecting the lead wire to a connection member by welding or brazing, cold-pressing the connected lead wire so that the linear rising part of the lead wire may be harder than the other part of the lead wire, then machining and bending the lead wire.

However, the conventional connecting method makes the whole part of the lead wire have an approximately identical thickness. Therefore, during rotation of the electric rotating machine, an excessive centrifugal force concentrates on the joint between the linear rising part of the lead wire and the connection member, that is, the part which was softened by electron-beam welding. This allows plastic deformation on the joint. The latter connecting method in the above description which cold-presses the linear rising part of the lead wire after welding or brazing cannot be free from hardening not only the welded or brazed part but also the other part of the lead wire. As the result, the toughness of the non-welded part of the lead wire falls and becomes fragile. In an extreme case, the part may be broken.

SUMMARY OF THE INVENTION

A main object of the present invention is to provide an electric rotating machine and a method of connecting feeding lead wires thereto, which can increase the resistance to centrifugal forces of the lead wire without controlling the hardness of the lead wire by post-processing such as cold pressing and suppress plastic deformation of the joint between the lead wire and the joint conductor.

The present invention is basically characterized by concentrating stresses due to excessive centrifugal forces during rotation of the electric rotating machine to any other part of the lead wire than the joint between the lead wire and the joint conductor and preventing said other part of the lead wire from being softened by welding or brazing of the joint.

Concretely, to concentrate stresses due to excessive centrifugal forces during rotation of the electric rotating machine to any other part of the lead wire than the joint between the lead wire and the joint conductor, the present invention forms, on the lead wire, a first part to be connected to said joint conductor, a second part thinner than said first part, and a third part which is between said first and second parts and has the thickness changing from the thickness of said first part to the thickness of the second part. Further, to prevent said other part of the lead wire from being softened by welding or brazing of the joint, the present invention welds by electron beams or brazes the first part of the lead wire to the joint conductor while cooling the lead wire.

Here, the thickness of the first part and the thickness of second part represent distances of opposite surfaces along the longitudinal axis of the lead wire except surfaces perpendicular to the curved surfaces.

When the feeding lead wire in accordance with the present invention is applied to an electric rotating machine, the stress due to the excessive centrifugal force during rotation concentrates on the third part of the feeding lead wire. In other words, the third part of the lead wire increases its thickness toward the first part and the cross-section of the third part perpendicular to the longitudinal axis of the lead wire increases toward the first part. In other words, the third part varies its shape. Further, as the third part of the feeding lead wire will not be softened by welding or brazing of the joint, the third part can be kept as hard as the second part of the lead wire. Further the stresses due to excessive centrifugal forces during rotation of the electric rotating machine concentrate to this third part and weakened. This can protect the first part of the lead wire which is connected to the joint conductor from concentration of the stresses and suppress the plastic deformation of the first part.

Further, as the third part of the feeding lead wire will not be softened when the first part of the lead wire is welded or brazed to the joint conductor, the limit of elasticity of the third part can remain unchanged. In other words, the hardness of the second and third parts of the feeding lead wire can be greater than the hardness of the joint between the first part and the joint conductor. Therefore, the third part can fully stand the stresses due to excessive centrifugal forces.

Although the first part of the feeding lead wire is softened by electron-beam-welding or brazing, the first part is thicker than the second and third parts of the lead wire and wider than the second and third parts in the cross-section perpendicular to the longitudinal axis of the lead wire. Therefore, the lead wire can fully secure the resistance to the stresses due to excessive centrifugal forces.

BRIEF DESCRIPTION OF THE DRAWINGS

FIG. 1 shows an illustration of a first embodiment of the present invention.

FIG. 5 shows cross-sectional views of the third part of the feeding lead wire of FIG. 1.

FIG. 7 is a cross-sectional view of the joint to be welded by electron beams.

PREFERRED EMBODIMENTS OF THE INVENTION

Embodiment 1

Figure 1A:
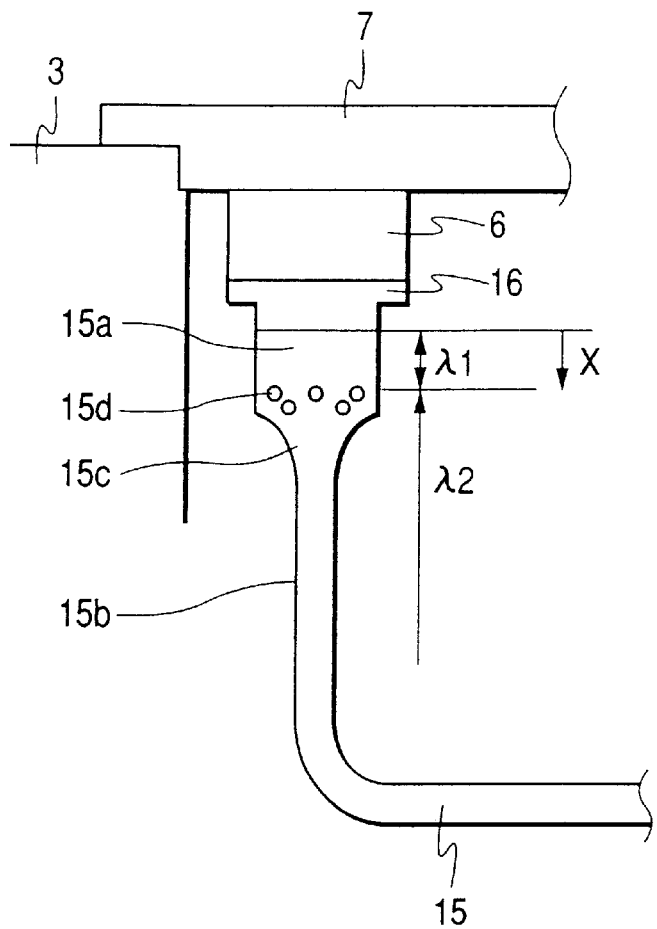
FIG. 1(a) is a cross-sectional view of a feeding lead wire and FIG. 1(b) shows the relationship between the hardness of the feeding lead wire and the distance "x" from the joint of the feeding lead wire.
Figure 1B:
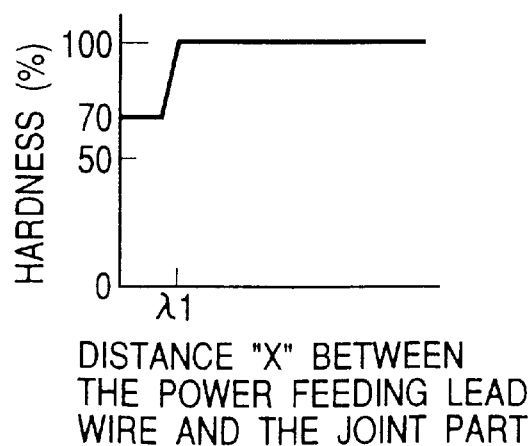

Below will be explained a first embodiment of the present invention referring to FIG. 1 to FIG. 5. FIG. 2 shows the constitution of a turbine generator which is the first embodiment of the present invention. Referring to FIG. 2, a stator casing 1 contains a cylindrical stator core 2 inside the casing. The stator core has a plurality of continuous slots on the periphery along the axis of the core. Each slot contains a stator winding. Further, the stator core 2 has a plurality of continuous ducts on the core 2 along the axis of the stator core.

A rotor core 3 is enclosed in the stator core 2 with a clearance therebetween. The rotor core has a plurality of continuous slots on the periphery along the axis of the core. Each slot contains a rotor winding 6. Each rotor winding 6 has a circular retaining ring 7 at each end of the winding to press the ends of each rotor winding 6. A rotor shaft 4 is provided in a body in the center of the rotor core 3.

The stator casing 1 has a circular bracket 10 at each end of the casing. A bearing unit 9 to rotate the rotor shaft freely is provided in the inner side of the bracket 10. A cooling fan 8 is provided on each end of the rotor shaft 4. A plurality of cooling units 11 are provided in the space between the stator casing 1 and the stator core 2 to cool the cooling gas which is boosted by the cooling fan 8 to circulate in the electric rotating machine.

A plurality of terminals 12 are provided on the bottom of the outer periphery of the stator housing to extract the generated power. A current collector 13 is provided on one end of the generator. The current collector works to supply power to the rotor windings and constructed so that the carbon brushes retained by the retailers pressed against a current collection ring on one end of the rotary shaft 4 may supply power from the stationary side to the rotor side.

Figure 3:
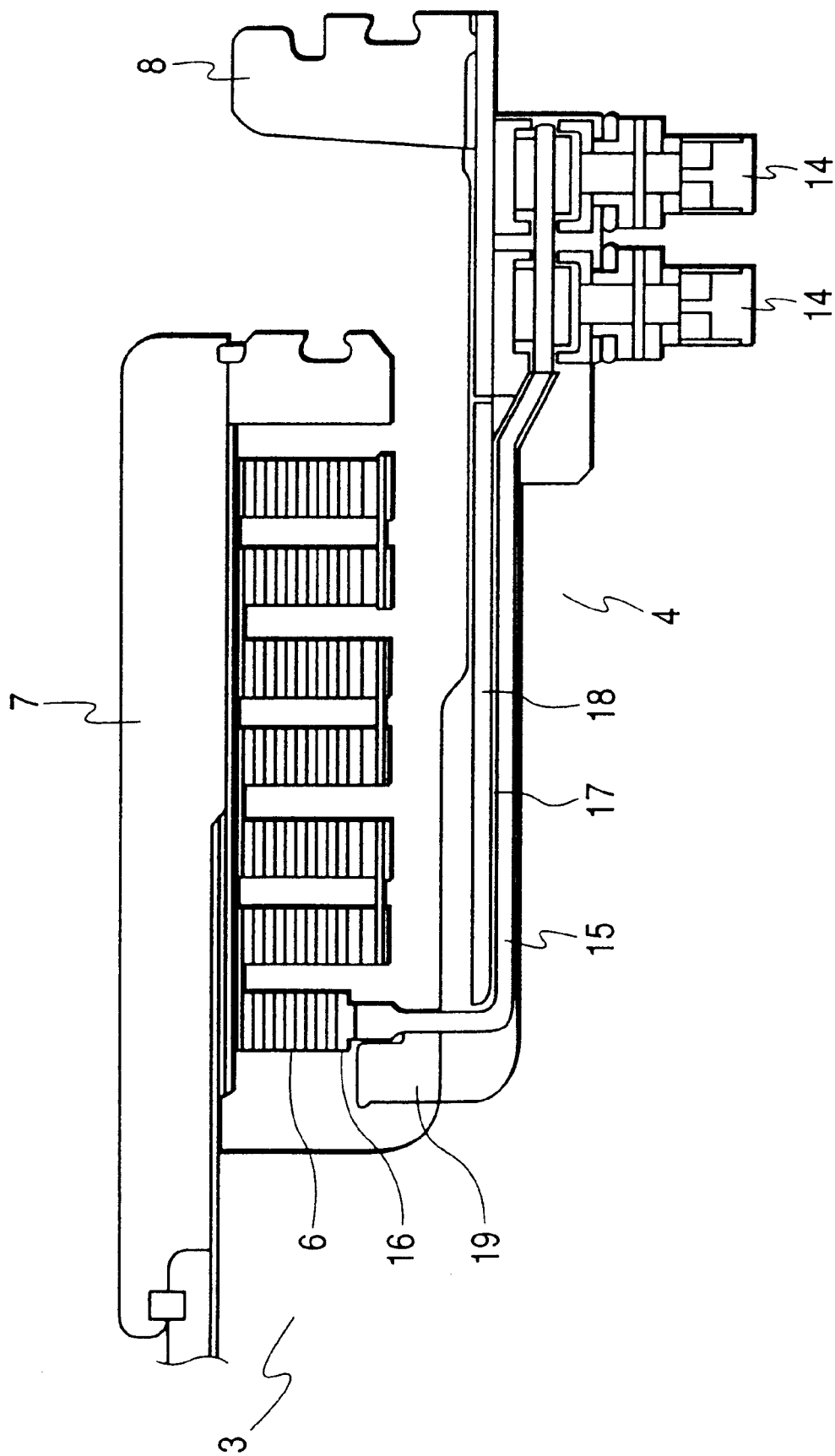
FIG. 3 is a cross-sectional view of one end of the rotor core of the turbine generator in FIG. 2

FIG. 3 shows the schematic constitution of part of the rotor core 3 in the current collector side 13. The power collected to the current collecting ring through the carbon brushes is fed to the rotor winding 6 through a terminal connected to the current collecting ring, a feeding lead wire 15 connected to the terminal 14, and a joint conductor 16 connected to both the feeding lead wire 15 and the rotor winding 6. The feeding lead wire 15 extends along the rotary shaft 4 from the terminal 14 to the place just under a rotor winding to which the lead wire is connected, bends upright there, and goes up straight axially outwards.

Part of the feeding lead wire extending along the rotary shaft 4 is fixed by a lead wedge 18 with insulating spacers 17 therebetween. The insulating spacers 17 are made of fiber-reinforced plastic material (FRP) containing glass fiber as its main ingredient. The linear rising part of the feeding lead wire 15 is supported and fixed by an insulating spacer 19.

Figure 2:
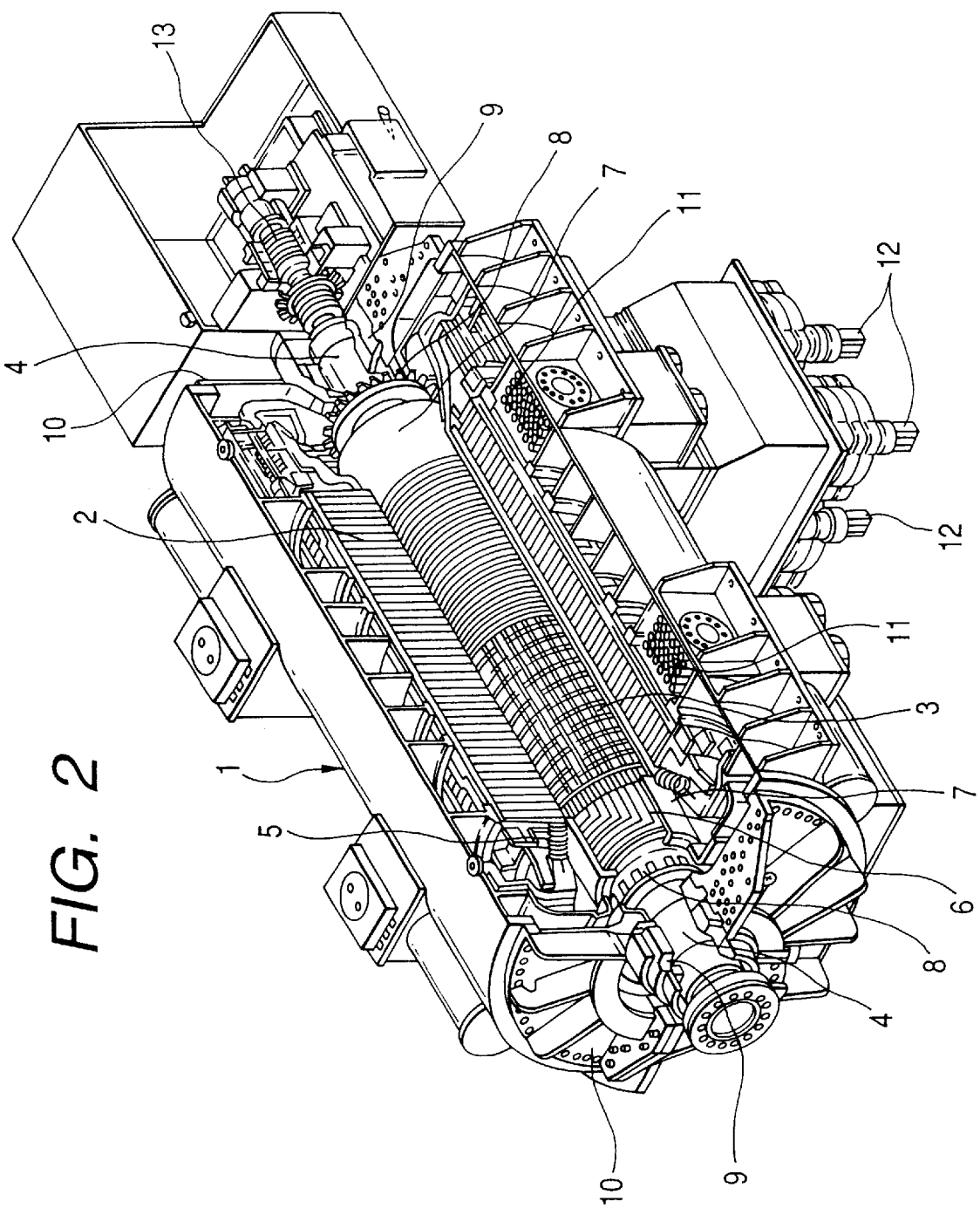
FIG. 2 is a perspective view of a turbine generator using the feeding lead wires of FIG. 1.

FIG. 1 shows the construction of the feeding lead wire 15. The lead wire 15 is a conductive material formed from the same copper material as the rotor winding 6. The lead wire is initially cuboidal. The lead wire 15 is worked to have a first part 15a, a second part 15b, and a third part 15c. The first part 15a is to be connected to a joint conductor 16 and contains a plurality of through-holes 15d through which a cooling medium flows. These through-holes 15d are used when the feeding lead wire 15 is jointed to a joint conductor 16.

The second part 15b is made thinner than the first part 15a. Therefore, the cross-section of the second part 15b perpendicular to the longitudinal axis of the feeding lead wire 15 is smaller than that of the first part 15a perpendicular to the longitudinal axis of the feeding lead wire 15. The third part 15c is formed between said first and second parts and has a thickness changing from the thickness of said first part 15a to the thickness of the second part 15b. Therefore, the cross-section of the third part 15c perpendicular to the longitudinal axis of the feeding lead wire 15 varies from the cross-section of the first part 15a perpendicular to the longitudinal axis of the feeding lead wire 15 to the cross-section of the second part 15b perpendicular to the longitudinal axis of the feeding lead wire 15.

Here, the thickness of the first part 15a and the thickness of second part 15b represent distances of opposite surfaces along the longitudinal axis of the lead wire except surfaces perpendicular to the curved surfaces of the third part. The thickness of the third part 15c represents the distance of the opposite two curved surfaces.

The joint conductor 16 is a projected mount to which the first part 15a of the feeding lead wire 15 is jointed. The projected joint area of the joint conductor 16 and the joint area of the first part 15a of the feeding lead wire are identical in shape and cross-section.

Figure 4:
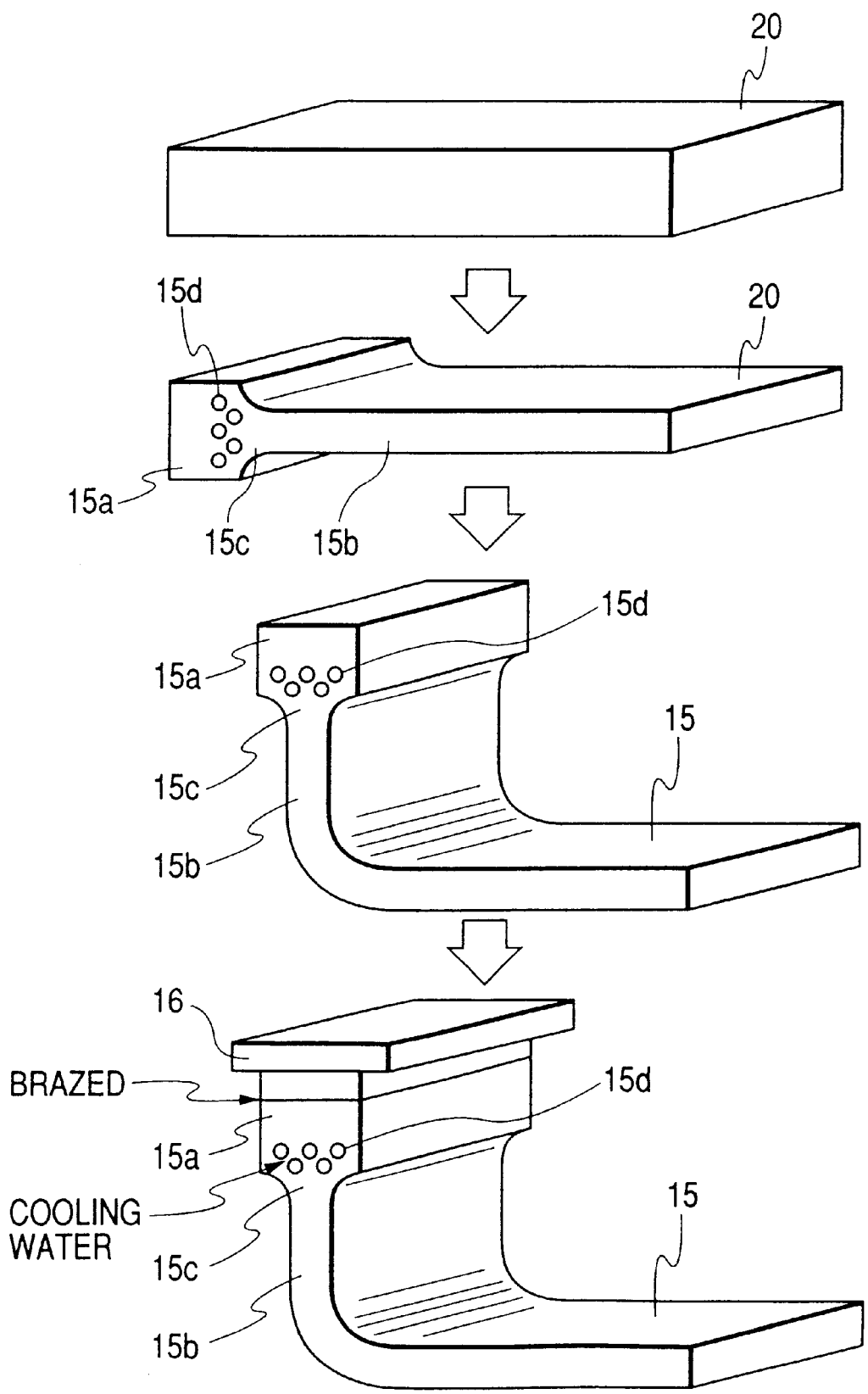
FIG. 4 is an illustration of explaining a method of jointing a feeding lead wire of FIG. 1

FIG. 4 shows a method of preparing, forming, and connecting a feeding lead wire 15 of the present embodiment. A feeding lead wire 15 is prepared by cutting out a flat cuboidal member 20 from a copper member wherein the hardness of the member 20 is approximately identical over the full length of the feeding lead wire (this initial hardness of the member 20 is defined as 100%), machining the member 20 to have a first part 15a, a second part 15b, and third part 15c, making a plurality of through-holes 15d to flow a cooling medium in the first part 15a, and bending the machined member 20.

Next, the feeding lead wire is brazed to a joint conductor 16 while water is flown through the through-holes 15a to cool the member 20. The first part 15a of the feeding lead wire 15 is softened by brazing. High heat by brazing re-crystallizes metal crystals in the feeding lead wire 15. As the result, the crystal gains become greater and crystal boundaries disappear, which reduces the hardness of the first part 15a. As seen from FIG. 1(b), the hardness of area "λ1" of the first part 15a, particularly the joint of the first part 15a and the joint conductor falls down to about 70%.

However, as the first part 15a of the feeding lead wire 15 is being cooled, the hardness of the feeding lead wire 15 gradually becomes greater as the distance "x" from the joint between the feeding lead wire 15 and the joint conductor 16 becomes greater.

The hardness of area "λ2" including part of the first part 15a, the third part 15c, and the second part 15b is approximately 100% which is equal to the hardness before brazing. In other words, this area "λ2" is not affected by high heat due to brazing. As the result, the hardness of the area "λ2" including part of the first part 15a, the third part 15c, and the second part 15b is greater than the hardness of the "λ1" of the first part 15a. The second part 15b is approximately as hard as the third part 15c.

In summary, this embodiment forms a first part 15a, a second part 15b, and a third 15c on the feeding lead wire 15 and brazes the first part 15a to the joint conductor 16 while cooling the first part 15a of the feeding lead wire 15. When the feeding lead wires 15 of this embodiment are applied to a turbine generator, stresses due to excessive centrifugal forces during rotation can be concentrated to the third parts 15c of the feeding lead wires 15.

In other words, the third part 15c of the feeding lead wire 15 increases its thickness toward the first part 15a and its cross-section perpendicular to the longitudinal axis of the feeding lead wire 15 toward the first part 15a, changing its shape. Further, as the third part 15c of the feeding lead wire 15 is not softened by high heat for jointing to the joint conductor 16, the hardness of the third part 15c can be kept approximately equal to that of the second part 15b. Therefore, the stresses due to excessive centrifugal forces during rotation of the electric rotating machine concentrate to this third part 15c and weakened. This can protect the first part 15a of the lead wire 15 from concentration of the stresses and suppress the plastic deformation of the first part 15a.

Further in accordance with this embodiment, as the third part 15c of the feeding lead wire 15 is not softened by high heat for jointing to the joint conductor 16, the limit of elasticity of the third part 15c can remain unchanged. This can make the second part 15b and the third part 15c relatively harder than the joint between the first part 15a and the joint conductor 16 and make the third part 15c of the feeding lead wire 15 fully resistant to the stresses applied thereto.

Further in accordance with this embodiment, the first part 15a of the feeding lead wire 15 is softened by brazing. However, as the first part 15a is thicker than the second part 15b and the third part 15c and the cross-section of the first part 15a perpendicular to the longitudinal axis of the feeding lead wire 15 is greater than the cross-sections of the second part 15b and the third parts 15c perpendicular to the longitudinal axis of the feeding lead wire 15, a stress per a unit cross-section can be smaller and consequently, the first part 15a can fully resist to stresses by centrifugal forces.

In accordance with this embodiment, the joint conductor 16 has a projection whose joint area is as wide as the joint area of the first part 15a. Therefore, stresses due to excessive centrifugal forces will not be concentrated on the joint between the joint conductor 16 and the first part 15a and consequently the feeding lead wire 15 can fully secure the resistance to the stresses on the joint.

As this embodiment does not need steps of cold-pressing the feeding lead wires 15 which are conventionally required in connection of the feeding lead wires 15, this embodiment can have less connection steps than conventional methods have. This reduces the production cost of the turbine generator and increases the cost efficiency of the turbine generator.

Figure 5A:
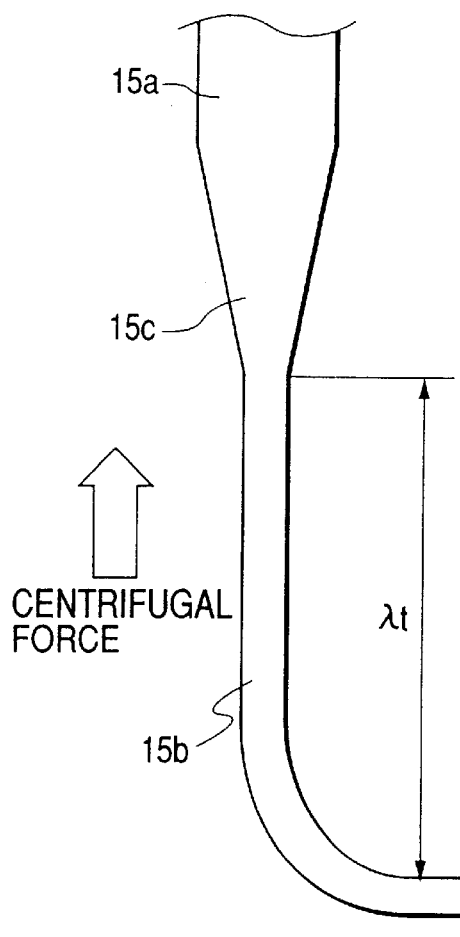
FIG. 5(a) is for a tapered third part and FIG. 5(b) is for a curved or rounded third part.

In accordance with this embodiment, the third part 15c of the feeding lead wire 15 is made curved (or round), but it can be tapered or formed properly according to the condition of connection of the feeding lead wire 15. For example, if the feeding lead wire 15 has a long linear rising part, the third part 15c of the feeding lead wire 15 is tapered as shown in FIG. 5(a). Contrarily, if the feeding lead wire 15 has a short linear rising part, the third part 15c of the feeding lead wire 15 is curved (or rounded) as shown in FIG. 5(b).

In case the linear rising part of the feeding lead wire 15 is deformed by a centrifugal force which exerts on a lead wire part extending along the rotary shaft, the quantity of a forced deformation ($\Delta t$) of the linear rising part of the feeding lead wire 15 is much smaller than the length "It" (where "It" >"Ir") of the linear rising part and the stress on the third part 15c of the feeding lead wire 15 is also extremely small. Therefore, the third part 15c of the feeding lead wire 15 can be either tapered or circular (or rounded). However, to assure the resistance to the stresses on the third part 15c of the feeding lead wire 15, it is preferable that the third part is tapered because the tapered shape can disperse stresses more than the circular or rounded shapes.

In case the linear rising part of the feeding lead wire 15 is deformed by a centrifugal force which exerts on a lead wire part extending along the rotary shaft, the quantity of a forced deformation ($\Delta t$) of the linear rising part of the feeding lead wire 15 is smaller than the length "Ir" (where "It" >"Ir") of the linear rising part. However, when the quantity of a forced deformation ($\Delta t$) is applied, the deformation on "Ir" becomes greater because of "It" >"Ir" and the stress on the third part 15c of the feeding lead wire 15 becomes greater than those on "It." In this case, when the third part 15c of the feeding lead wire 15 is tapered, the length "Ir" becomes shorter and the stress on the third part 15c of the feeding lead wire 15 becomes greater. When the third part 15c of the feeding lead wire 15 is curved or rounded, the length "Ir" can be made greater and the stress on the third part 15c of the feeding lead wire 15 can be smaller.

Figure 5B:
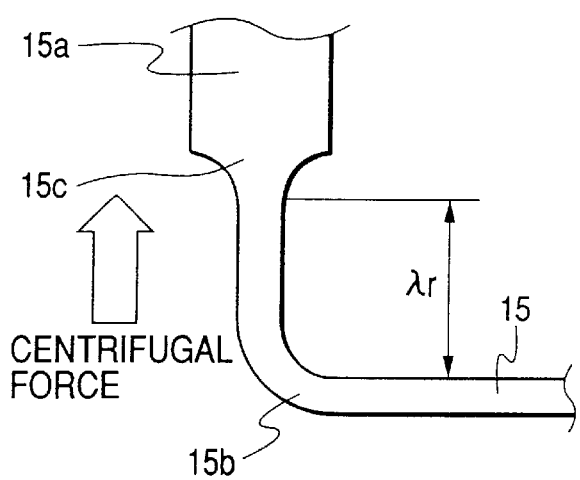

In short, this embodiment tapers the third part 15c of the feeding lead wire 15 as shown in FIG. 5(a) when the linear rising part of the feeding lead wire 15 is long or curves (or rounds) the third part 15c of the feeding lead wire 15 as shown in FIG. 5(b) when the linear rising part of the feeding lead wire 15 is short. As explained above, this embodiment can increase the resistance of the feeding lead wires to centrifugal forces even in small installation spaces. Further, this embodiment is most suitable to give the resistance of the feeding lead wires to centrifugal forces to small- and medium-size fast turbine generators which have small installation spaces.

This embodiment brazes a feeding lead wire 15 to a joint conductor while flowing cooling water through a plurality of through-holes in the first part 15a to cool the feeding lead wire 15. The similar effect can be obtained by brazing while cooling the third part 15c of the feeding lead wire 15 by an external cooling apparatus.

Embodiment 2

Figure 6:
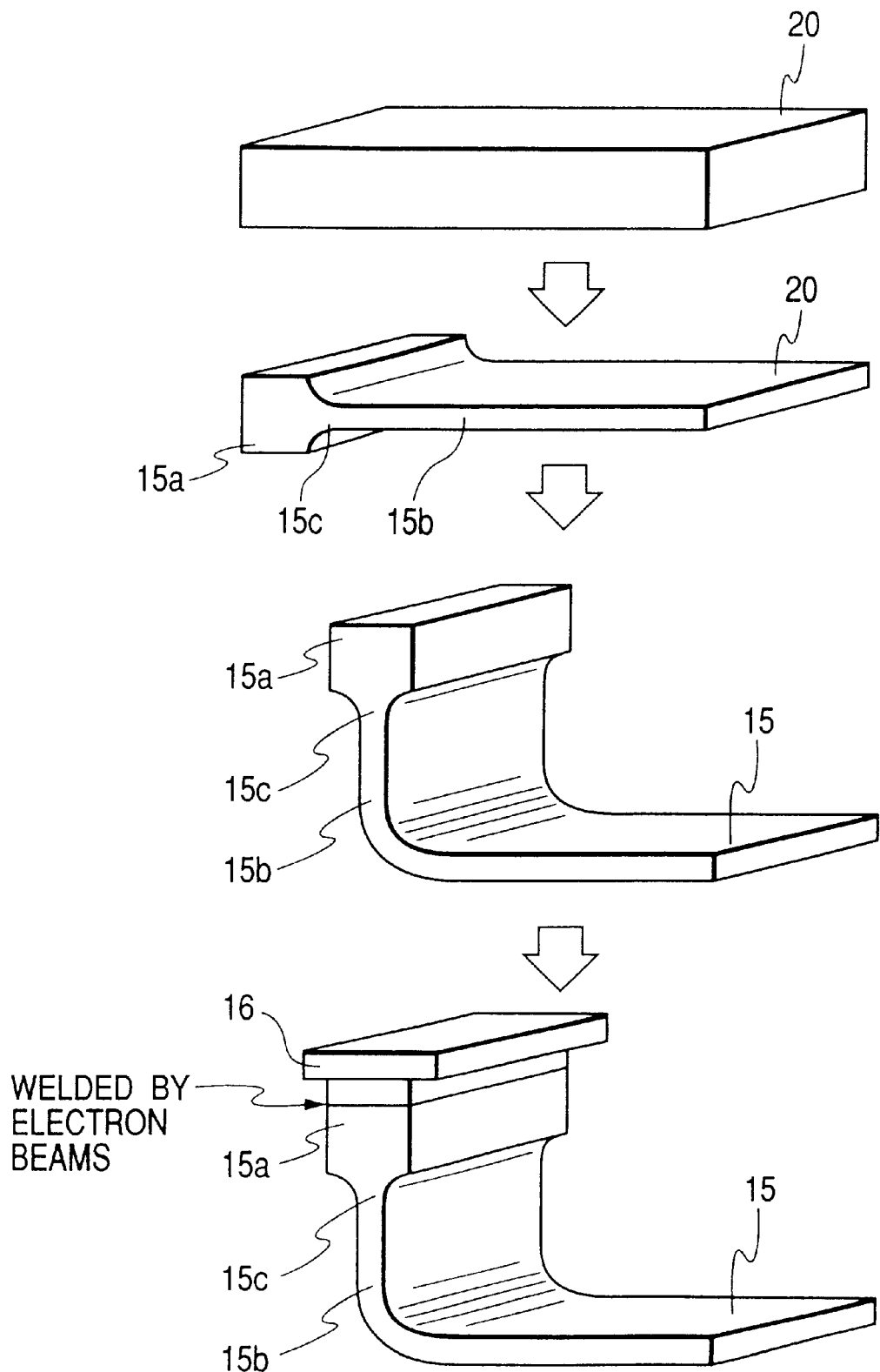
FIG. 6 is an illustration of explaining a method of jointing a feeding lead wire which is a second embodiment of the present invention.

A second embodiment of the present invention will be explained below referring to FIG. 6 and FIG. 7. This embodiment uses electron-beam welding to joint feeding lead wires 15 and joint conductors. The electron-beam welding softens very limited areas of the feeding lead wire 15 to weld and does not require such a plurality of through-holes for cooling medium in the first part 15a of the feeding lead wire 15 to cool the feeding lead wire 15 as in the aforesaid brazing. Therefore, the third part 15c of the feeding lead wire 15 will not be affected (softened) by high-heat for jointing the feeding lead wire 15 and the joint conductor 16.

Therefore, when the feeding lead wires 15 in accordance with this embodiment are applied to a turbine generator, the stresses due to excessive centrifugal forces during rotation of the turbine generator concentrate onto the third part 15c of the feeding lead wire 15 and weakened, and consequently, the plastic deformation of the first part 15a of the feeding lead wire 15 can be suppressed.

In accordance with this embodiment, the joint conductor 16 has a projection to which the first part 15a of the feeding lead wire 15 is jointed. This facilitates application of electron beams to the joint area between the projection of the joint conductor 16 and the first part 15a of the feeding lead wire 15, which increases the workability of electron-beam welding.

Figure 7A:
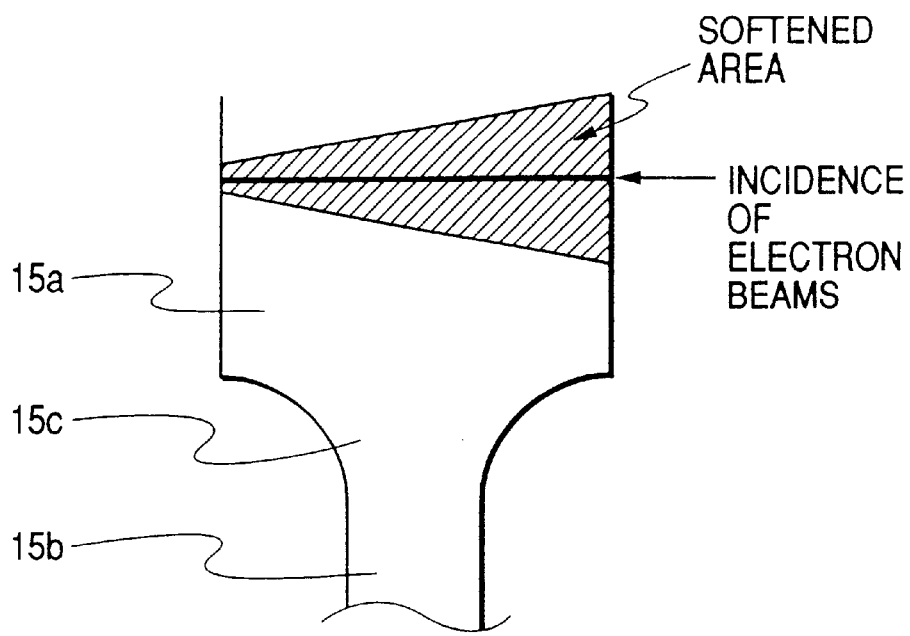
FIG. 7(a) shows one welding method which applies electron beams to one of the longer sides of the joint between the feeding lead wire and the joint conductor along the joint area.
Figure 7B:
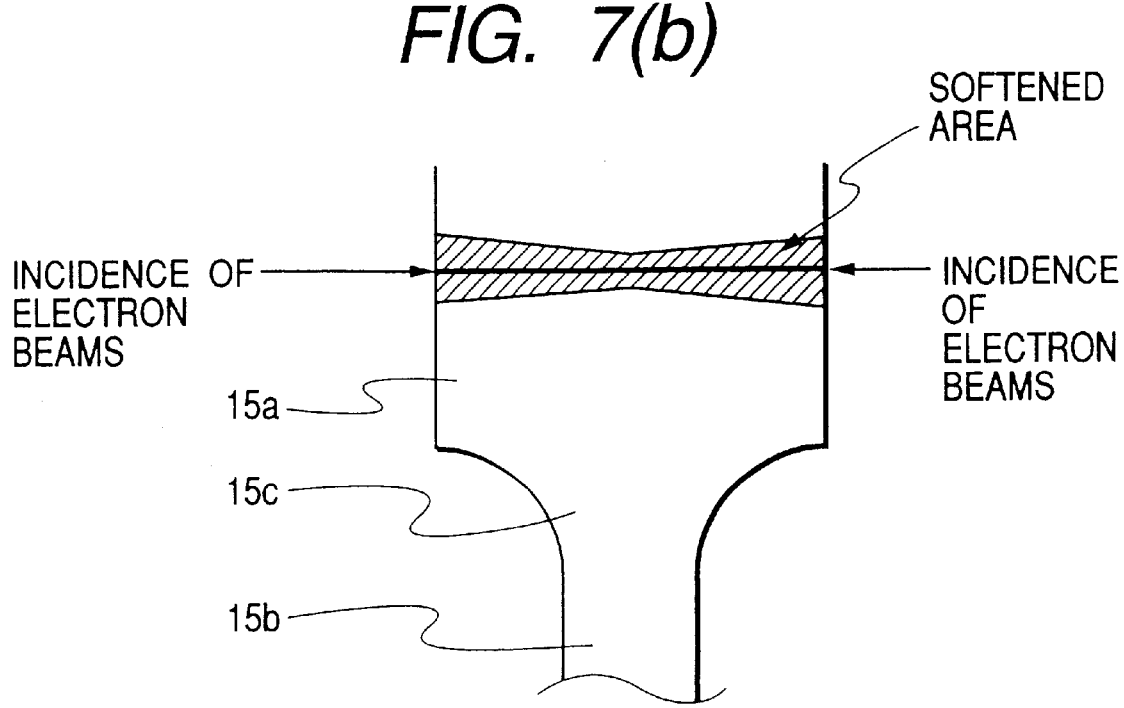
FIG. 7(b) shows the other method which applies electron beams to both of the opposite longer sides of the joint between the feeding lead wire and the joint conductor along the joint area.

FIG. 7 shows methods of welding by electron beams. There are two methods. One method is to apply electron beams to one of the longer sides of the joint between the first part 15a of the feeding lead wire 15 and the joint conductor 16 along the joint area as shown in FIG. 7(a). The other method is to apply electron beams to both of the opposite longer sides of the joint between the first part 15a of the feeding lead wire 15 and the joint conductor 16 along the joint area as shown in FIG. 7(b).

The former welding method requires a longer time period of heating by electron beams. There is a heating time difference between the front side (onto which the electron beams are given) of the joint and the rear side (opposite to the front side) of the joint. Therefore, the front side is softened wider than the rear side. As the result, stresses due to excessive centrifugal forces are apt to attack this wider softened portion of the joint and cause plastic deformation there.

This embodiment employs the latter welding method. This method can shorten the time period of heating by electron beams and allows both front and rear sides of the joint have the same heating time. Therefore this welding method can make the softened portion of the feeding lead wire 15 smaller than the former welding method. As the result, stresses on the first part 15a of the feeding lead wire 15 can be dispersed evenly and the plastic deformation of the first part 15a can be suppressed.

This embodiment uses electron-beam welding to joint the feeding lead wire 15 to the joint conductor and prevents the first part 15a of the feeding lead wire 15 from being softened. This softening influence can be suppressed more by cooling the third part 15c of the feeding lead wire 15 externally by a cooling apparatus.

Embodiment 3

Figure 8:
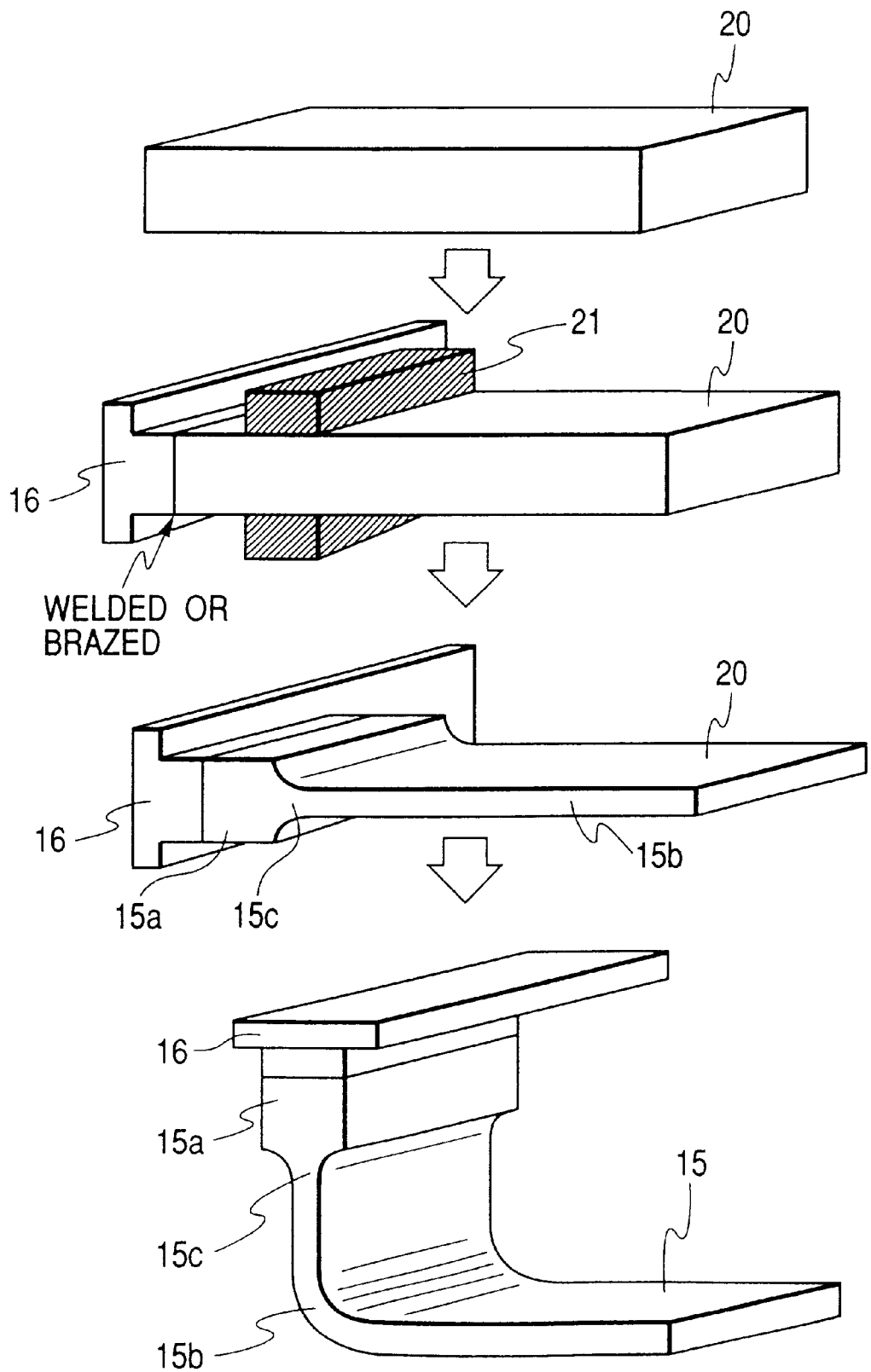
FIG. 8 is an illustration of explaining a method of jointing a feeding lead wire which is a third embodiment of the present invention.

Referring to FIG. 8, a third embodiment of the present invention will be explained below. FIG. 8 shows a procedure of jointing a feeding lead wire 15 in accordance with the present invention. This embodiment first forms a flat cuboidal member 20 from a copper material and joints this member 20 to a joint conductor 16 by brazing or welding by electron beams. To protect the third part 15c of the feeding lead wire 15 against high heat by welding or brazing, this embodiment applies a cooling apparatus 21 to each side of a part which will be a first part 15a of the feeding lead wire 15, and welds or brazes the joint while cooling it by the cooling apparatus. Next this embodiment machines the cuboidal member 20 jointed to the joint conductor 16 to form a first part 15a, a second part 15b, and a third part 15c on the member 20, then bends the machined member 20 to form a target shape of the lead wire.

This embodiment jointing the feeding lead wire 15 to the joint conductor by the above method also has an effect of concentrating stresses due to excessive centrifugal forces during rotation of the turbine generator onto the third part 15c of the feeding lead wire 15 and consequently suppressing the plastic deformation of the first part 15a of the feeding lead wire 15.

The present invention can increase the resistance of a feeding lead wire to centrifugal forces without controlling the hardness of the feeding lead wire by post-processing such as cold pressing and further suppress plastic deformation of the joint between the feeding lead wire and the joint conductor.

What is claimed is:

1. An electric rotating machine comprising a stator, a rotor core which can rotate inside said stator with a clearance between the rotor core and the inner surface of the stator, a stator winding formed around said rotor core, and a rotor having feeding lead wires connected to said rotor winding by means of a joint conductor;
   wherein said feeding lead wire comprises a first part connected to said joint conductor, a second part thinner than said first part, and a third part which is formed between said first and second parts and has a thickness changing from the thickness of said first part to the thickness of the second part; and
   wherein a size of a connecting plane of said joint conductor to said first part of said feeding leading wire and a size of a connecting plane of said first part of said feeding leading wire to said joint conductor are substantially the same.

2. An electric rotating machine comprising a stator, a rotor core which can rotate inside said stator with a clearance between the rotor core and the inner surface of the stator, a stator winding formed around said rotor core, and a rotor having feeding lead wires connected to said rotor winding by means of a joint conductor;
   wherein said feeding lead wire comprises a first part connected to said joint conductor, a second part thinner than said first part, and a third part which is formed between said first and second parts and has a thickness changing from the thickness of said first part to the thickness of the second part;
   wherein a size of connecting plane of said joint conductor to said first part of said feeding leading wire and a size of a connecting plane of said first part of said feeding leading wire to said joint conductor are substantially the same; and
   wherein said third part is approximately as hard as said second part.

3. An electric rotating machine comprising a stator, a rotor core which can rotate inside said stator with a clearance between the rotor core and the inner surface of the stator, a stator winding formed around said rotor core, and a rotor having feeding lead wires connected to said rotor winding by means of a joint conductor;
   wherein said feeding lead wire comprises a first part connected to said joint conductor, a second part thinner than said first part, and a third part which is formed between said first and second parts and has a thickness changing from the thickness of said first part to the thickness of the second part;
   wherein a size of a connecting plane of said joint conductor to said first part of said feeding leading wire and a size of a connecting plane of said first part of said feeding leading wire to said joint conductor are substantially the same; and
   wherein said second and third parts are harder than the joint where said first part is connected to said joint conductor and said third part is approximately as hard as said second part.

4. An electric rotating machine in accordance with one of claims 1 to 3, wherein said first part has through-holes to pass cooling medium.

5. An electric rotating machine in accordance with one of claims 1 to 3, wherein said third part is formed in a rounded or tapered shape.

6. An electric rotating machine in accordance with one of claims 1 to 3, wherein said first part is connected to said joint conductor by a welded connection.

7. An electric rotating machine in accordance with claim 6, wherein said welded connection is one of an electron beam welded connection and a brazed welded connection.

8. An electric rotating machine comprising a stator, a rotor core which can rotate inside said stator with a clearance between the rotor core and the inner surface of the stator, a stator winding formed around said rotor core, and a rotor having feeding lead wires connected to said rotor winding by means of a joint conductor;

wherein said feeding lead wire comprises a first part connected to said joint conductor, a second part thinner than said first part, and a third part which is formed between said first and second parts and has a thickness changing from the thickness of said first part to the thickness of the second part; and wherein said first part has through-holes to pass cooling medium.

9. An electric rotating machine comprising a stator, a rotor core which can rotate inside said stator with a clearance between the rotor core and the inner surface of the stator, a stator winding formed around said rotor core, and a rotor having feeding lead wires connected to said rotor winding by means of a joint conductor;

wherein said feeding lead wire comprises a first part connected to said joint conductor, a second part thinner than said first part, and a third part which is formed between said first and second parts and has a thickness changing from the thickness of said first part to the thickness of the second part;

wherein said third part is approximately as hard as said second part; and wherein said first part has through-holes to pass cooling medium.

10. An electric rotating machine comprising a stator, a rotor core which can rotate inside said stator with a clearance between the rotor core and the inner surface of the stator, a stator winding formed around said rotor core, and a rotor having feeding lead wires connected to said rotor winding by means of a joint conductor;

wherein said feeding lead wire comprises a first part connected to said joint conductor, a second part thinner than said first part, and a third part which is formed between said first and second parts and has a thickness changing from the thickness of said first part to the thickness of the second part;

wherein said second and third parts are harder than the joint where said first part is connected to said joint conductor and said third part is approximately as hard as said second part; and wherein said first part has through-holes to pass cooling medium.

* * * * *